(12) United States Patent
Kochanski

(10) Patent No.: US 7,731,133 B2
(45) Date of Patent: Jun. 8, 2010

(54) HOLD DOWN DEVICE

(76) Inventor: Jerome J. Kochanski, P.O. Box 6397, Scottsdale, AZ (US) 85261

( * ) Notice: Subject to any disclaimer, the term of this patent is extended or adjusted under 35 U.S.C. 154(b) by 1600 days.

(21) Appl. No.: 10/828,746

(22) Filed: Apr. 20, 2004

(65) Prior Publication Data

US 2005/0230571 A1 Oct. 20, 2005

(51) Int. Cl.
*A47B 97/00* (2006.01)

(52) U.S. Cl. .............. 248/79; 248/80; 248/89; 137/899

(58) Field of Classification Search .......... 248/89, 248/75, 79, 80, 910; 224/42.32, 42.4; 137/899, 137/355.16
See application file for complete search history.

(56) References Cited

U.S. PATENT DOCUMENTS

| | | | |
|---|---|---|---|
| 3,250,434 A * | 5/1966 | Howlett | ................ 222/143 |
| 3,572,622 A | 3/1971 | Smith | |
| 4,228,978 A | 10/1980 | Rand | |
| 4,416,396 A * | 11/1983 | Ward | .................... 222/129 |
| 4,602,599 A * | 7/1986 | Glagola | ................ 123/179.9 |
| 4,796,926 A | 1/1989 | Rapsilver | |
| 5,000,405 A | 3/1991 | Rybak et al. | |
| 5,311,909 A | 5/1994 | Adcock | |
| 5,330,233 A | 7/1994 | Kress | |
| 5,431,455 A | 7/1995 | Seely | |
| 5,588,459 A * | 12/1996 | Ellis | ...................... 137/239 |
| 6,068,163 A * | 5/2000 | Kihm | ...................... 222/189.1 |
| 6,138,853 A * | 10/2000 | Frechette | ............. 220/212.5 |
| 6,325,251 B1 * | 12/2001 | Santos | ................ 222/192 |
| 6,554,233 B1 | 4/2003 | Ungerecht | |
| 7,108,026 B2 * | 9/2006 | Luca | ..................... 141/231 |

* cited by examiner

*Primary Examiner*—J. Allen Shriver, II
*Assistant Examiner*—Steven M Marsh
(74) *Attorney, Agent, or Firm*—Schmeiser, Olsen & Watts LLC

(57) ABSTRACT

Embodiments of the present invention provide a hold down device for holding down a discharge hose during draining consists of a container filled with a filling material, a handle, a filling hole, a plug, feet, and a hose recess. The use of a hold down device of the present invention prevents the dislodging of a discharge hose while draining a septic holding tank from a recreational vehicle thus preventing spillage of waste material by covering the discharge hose and a sewer fitting and holding the sewer fitting within a refuse hole of a dump receptacle. Additionally, a hold down device embodiment of the present invention is easy and convenient to use while maintaining the proper functionality of holding a discharge hose and sewer fitting down during draining of the holding tank.

14 Claims, 4 Drawing Sheets

HOLD DOWN DEVICE

BACKGROUND OF THE INVENTION

1. Technical Field

This invention generally relates to a hold down device for use with a flexible hose, and more particularly to a hold down device for use with a discharge hose to maintain placement of the end of the hose with a sewage dump receptacle.

2. State of the Art

Recreational vehicles, like motor homes and camper trailers, typically provide toilets, sinks, and showers for use by owners or users of the recreational vehicle. While these amenities are nice, they still produce a certain amount of sewage and waste material. Most recreational vehicles are equipped with up to a 50 gallon holding tank that can store approximately 500-600 pounds of waste. In order to drain the waste, recreational vehicles typically have a discharge hose that enables the user to drain the holding tank contents into a sewage dump receptacle.

Sewage discharge hoses are typically a light-weight, vinyl covered spring ring type discharge hose with one end connected to valves controlling the flow of the sewage from the holding tank and the other end of the hose having a sewer fitting for placement into the dump receptacle's refuse hole. Because recreational vehicles can hold so much sewage and the holding tank is approximately 24 inches or higher, the force at which the sewage travels through the discharge hose is often very high. Therefore, if the sewer fitting on the end of the discharge hose is not secured properly, the force of the draining waste discharge can easily dislodge the discharge hose from the dump receptacle creating an unsanitary spill of either both black water (treated sewage) or grey water (water drained form showers and sinks).

Conventional solutions to the problem are discharge hose securing devices that include rocks or other heavy objects, tie downs around the hose, and use of a heavy dump receptacle lid. These conventional methods have several problems. The conventional securing devices can easily be dislodged from holding of the discharge hose, may not provide enough weight to keep hose from jarring loose from the dump receptacle, particularly on various types of uneven surfaces. Conventional devices are also not able to be conveniently stored and may also be time consuming in performing their function. Additionally, conventional devices are not equipped to account for different hose sizes and do not allow the use of multiple devices if needed.

Accordingly, what is needed is a device that solves the problems of dislodging of the device, lack of ease and convenience of use, time consumption, using on all types of surfaces, hose size consideration, and use of multiple devices due to the large amounts of force that is placed upon the hose during draining.

DISCLOSURE OF THE INVENTION

The present invention relates to a hold down device that overcomes the aforementioned dislodging, convenience, time consumption, multi-surface use, varying hose size, and multiple device use problems. Hold down device embodiments of the present invention are not easily dislodged, convenient and easy to use and can vary in weight to securely hold down a discharge hose. They also may be used on all types of surfaces, provide for different sized hoses, and are easily adaptable for use of multiple hold down devices.

Generally, a hold down device comprises a container, a handle, a hose recess, a filling hole, a plug, and feet. Accordingly, although the invention may be readily adapted to a variety of embodiments of a hold down device of the invention for securely holding a discharge hose in place during draining into a dump receptacle, the drawing figures depict a first hold down device embodiment of the invention for securely holding a discharge hose during draining and also depict two alternative embodiments of a hold down device according to the present invention.

The container may be hollow so as to be filled with water, sand, rocks, or any other material to provide sufficient weight to hold down a discharge hose during draining. The container may be filled by using the filling hole and the plug is removably coupled to the filling hole to retain the fill material within the container. The hose recess may be of sufficient size to receive a discharge hose and remain in contact with the ground. The feet may each be a circular molded relief on the bottom surface of the container to enable the hold down device to rest over a splash ring that is typically supplied with the sewer fitting on the end of the discharge hose.

Different from the conventional securing devices, the present invention allows the user to easily place the hold down device onto the discharge hose. The container may be easily emptied and filled to put a heavier material in for discharge hoses that produce greater force. The feet and the hole recess allows for the resting of the hold down device on the ground surface to prevent easy dislodging by completely retaining a portion of the hose within the hose recess and additionally providing feet to compensate for the splash ring enabling the present invention to rest evenly on the ground surface.

Several hold down devices of the present invention may also be used in conjunction with each other such as, for example, as a mid-hose hold down device in conjunction with another holding the end portion of the discharge hose, or stacked to provide greater weight for discharge hoses that generate greater forces. Additionally, hold down devices of the present invention are of a shape that enables the user to wrap the discharge hose around a device for easier storage and access. The device may also contain a locking mechanism to prevent theft of the device.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to a hold down device for use with a discharge hose that overcomes the aforementioned dislodging, convenience, time consumption, multi-surface use, variable hose size, and multiple device use problems. Hold down devices of the present invention generally comprise a canister, a handle, a filling hole, a plug, and a hose recess.

Figure 1:
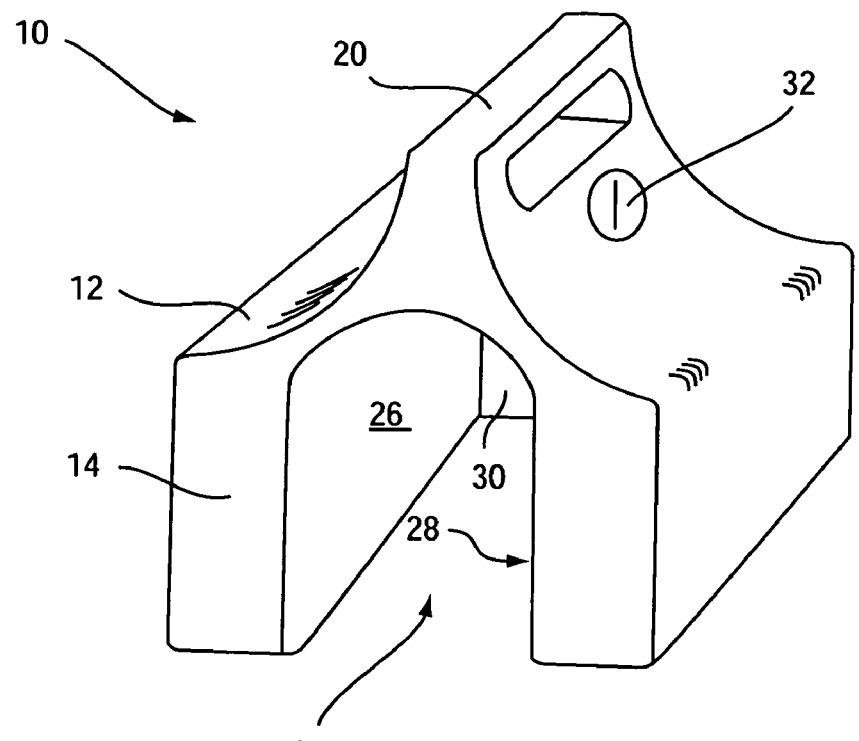
FIG. 1 is a perspective view of a hold down device according to an embodiment of the present invention.
Figure 2:
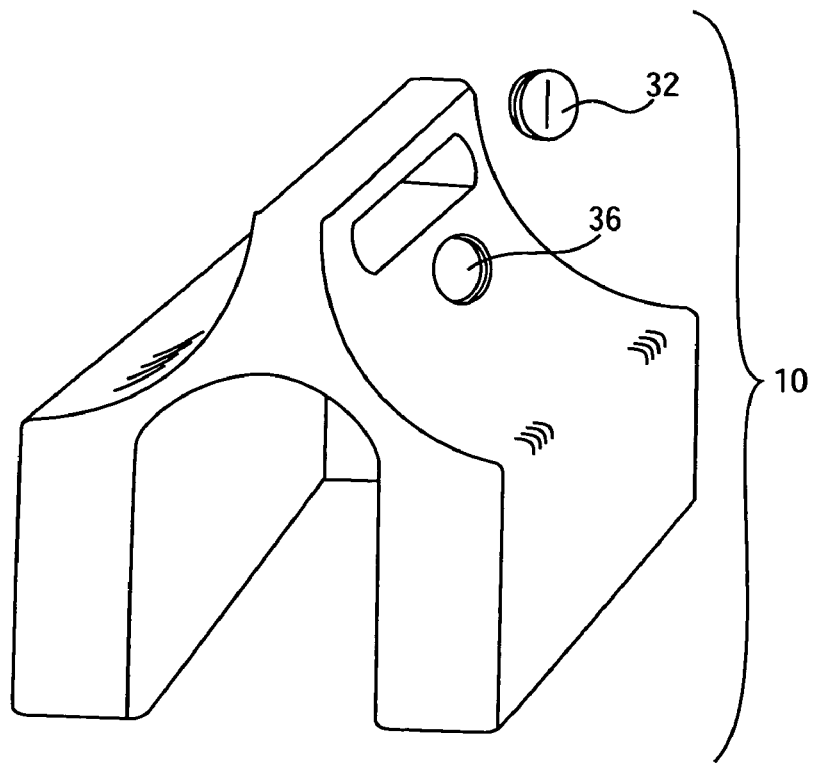
FIG. 2 is an exploded view of a hold down device according to an embodiment of the present invention.

Accordingly, although the invention may be readily adapted to a variety of embodiments of a hold down device, with reference to FIGS. 1 and 2 hold down device 10 is an example of a hold down device of the invention. Hold down device 10 generally comprises container 12, handle 20, filling hole 36, plug 32, and hose recess 24. As shown in FIG. 1, hold down device 10 is in a functional position with plug 32 removably coupled to filling hole 36.

Referring now to FIGS. 1-5, and for the exemplary purposes of this disclosure, preferred components of hold down device 10 are shown. Container 12 may be hollow with access to the hollow inside of container 12 through filling hole 36. Plug 32 is removably coupled to filling hole 36. For the exemplary purposes of this disclosure, plug 32 is removably coupled to filling hole 36 by use of threads. The coupling of plug 32 and filling hole 36 will be understood to not be limited to threads, but may also use a press fit, clips, or any available form of coupling.

Hose recess 24 generally comprises a left wall 26, a right wall 28 and a rear wall 30. For the exemplary purposes of this disclosure, hose recess 24 extends from front end 14 of container 12 up to rear end 16 of container 12 to form rear wall 30 of hose recess 24. It will be understood by those of ordinary skill in the art that hose recess 24 may extend from front end 14 through rear end 16 creating a channel and is not limited to exemplary shape and size disclosed.

Feet 34 protrude from a bottom portion 18 of container 12. Feet 34 may vary in number and size dependant on the size of hold down device 10. For exemplary purposes of this disclosure, feet 34 are each a circular molded relief that contact the ground surface when hold down device 10 is in use.

Figure 6:
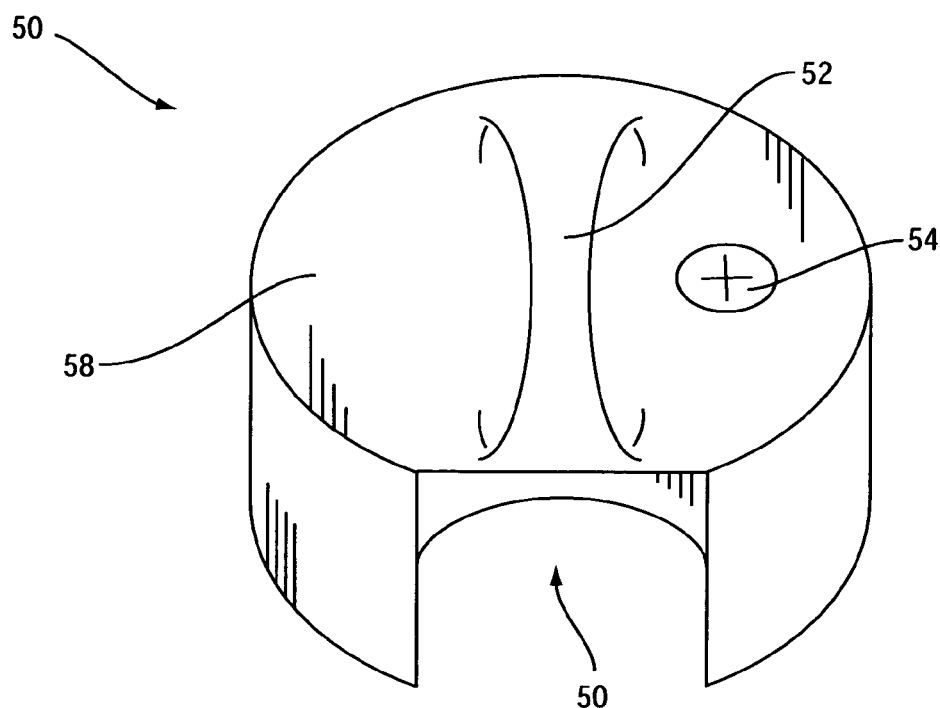
FIG. 6 is a perspective view of a cylindrical hold down device according to an embodiment of the present invention.
Figure 7:
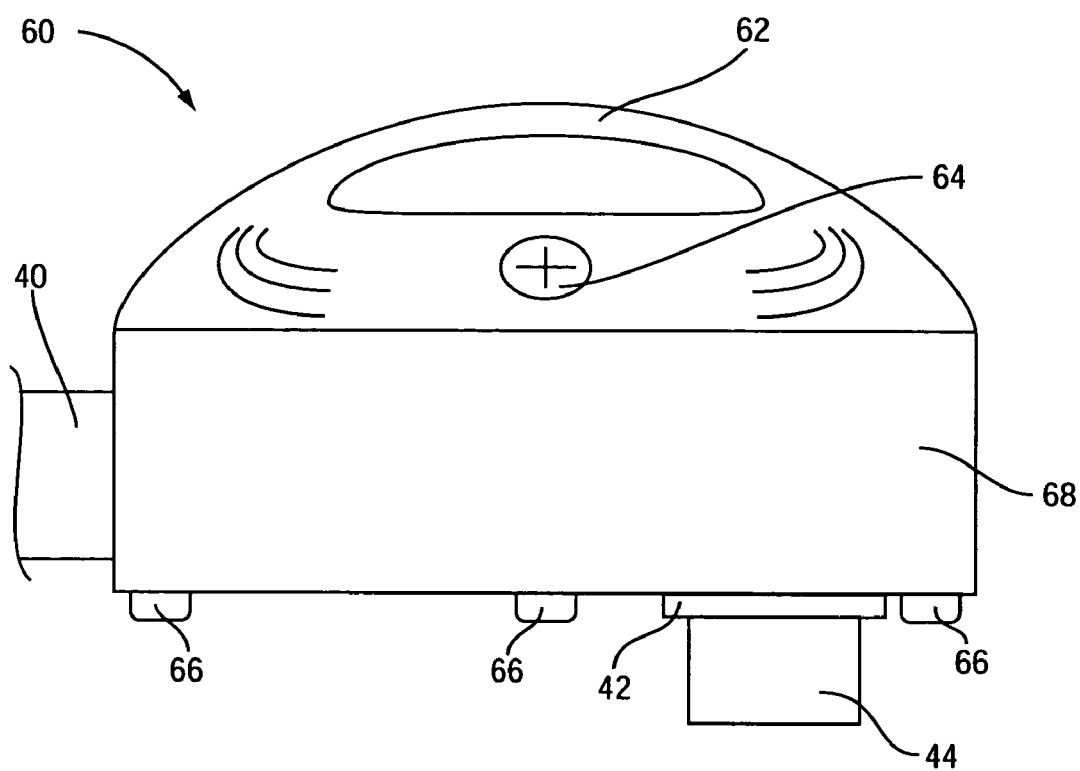
FIG. 7 is a side view of a hold down device with an alternative handle configuration.

It will be understood by those of ordinary skill in the art that the invention is not limited to hold down 10 and its components disclosed herein, as virtually any hold down device and components known in the art consistent with the intended operation of a hold down device may be utilized. Accordingly, for example, although particular hold down device, container, plug, feet, and other components are disclosed, such components may comprise any shape, size, style, type, model, version, measurement, material, and/or the like as is known in the art for such components consistent with the intended operation of a hold down device of the invention. For example, and referring to FIGS. 6 and 7, hold down device 50 comprises a cylindrical container 58 with handle 52, plug 54, and hose recess 56 or additionally, hold down device 60 comprises container 68, handle 62, plug 64, feet 66 and is configured to receive a larger portion of discharge hose 40 coupled to sewer fitting 44 which is coupled to splash ring 42. It will also be understood by those of ordinary skill in the art that the invention is not limited to use of any specific components, provided that the components selected are consistent with the intended operation of a hold down device of the invention.

The components defining any hold down device embodiment of the invention may be formed of any of many different types of materials or combinations thereof that can readily be formed into shaped objects provided that the components selected are consistent with the intended mechanical operation of a hold down device of the invention. For example, the components may be formed of the following types of materials and/or any combinations thereof: rubber, such as synthetic, natural, and/or other like materials; composites such as fiberglass, carbon-fiber, and/or other like materials; polymers, such as plastic, polycarbonates, tinted polycarbonates, PVC plastic, ABS plastic, polystyrenes, nylon, phenolics, and/or other like materials; elastomers, such as thermoplastic elastomers and/or other like materials; metals, such as zinc, magnesium, copper, iron, steel, and/or other like materials; and/or alloys, such as aluminum and/or other like materials. Additionally, components may include within the manufactured materials UV inhibitors to prevent compromising of material properties of components subjected to large quantities of ultra violet rays from the sun.

The components defining any hold down device embodiment of the invention may be purchased pre-manufactured or manufactured separately and then assembled together. However, any or all of the components may be manufactured simultaneously and integrally joined with one another. Manufacture of these components separately or simultaneously may involve extrusion, pultrusion, injection molding, resin transfer molding, casting, milling, cutting, welding, soldering, riveting, punching, stamping, and/or the like. If any of the components are manufactured separately, they may then be coupled with one another in any manner known in the art, such as with adhesive, a weld, a fastener (e.g. a bolt, a screw, a rivet, a securing pin), any combination thereof, and/or the like for example, depending on, among other considerations, the particular material forming the components. Other possible steps might include sand blasting, polishing, powder coating, and/or painting the components for example.

Figure 3:
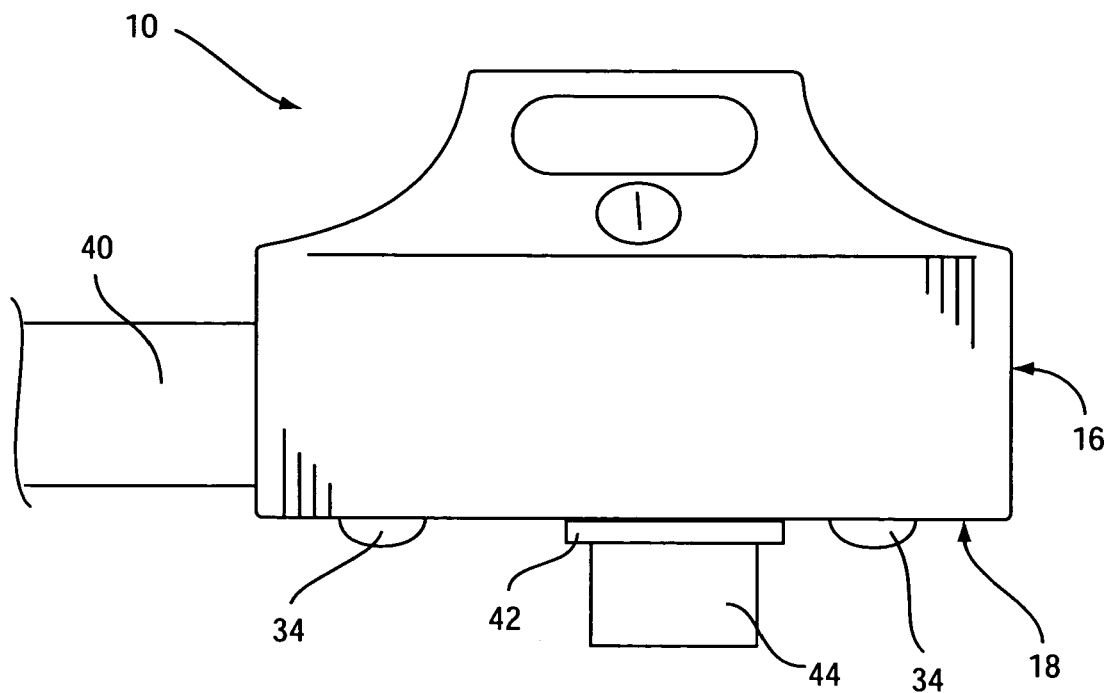
FIG. 3 is a side view of a hold down device securely holding a discharge hose.
Figure 4:
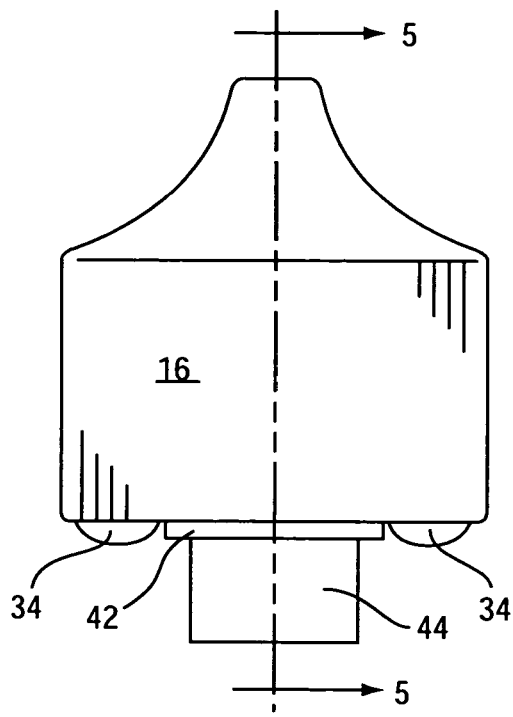
FIG. 4 is a rear view of a hold down device configured to receive a discharge hose.
Figure 5:
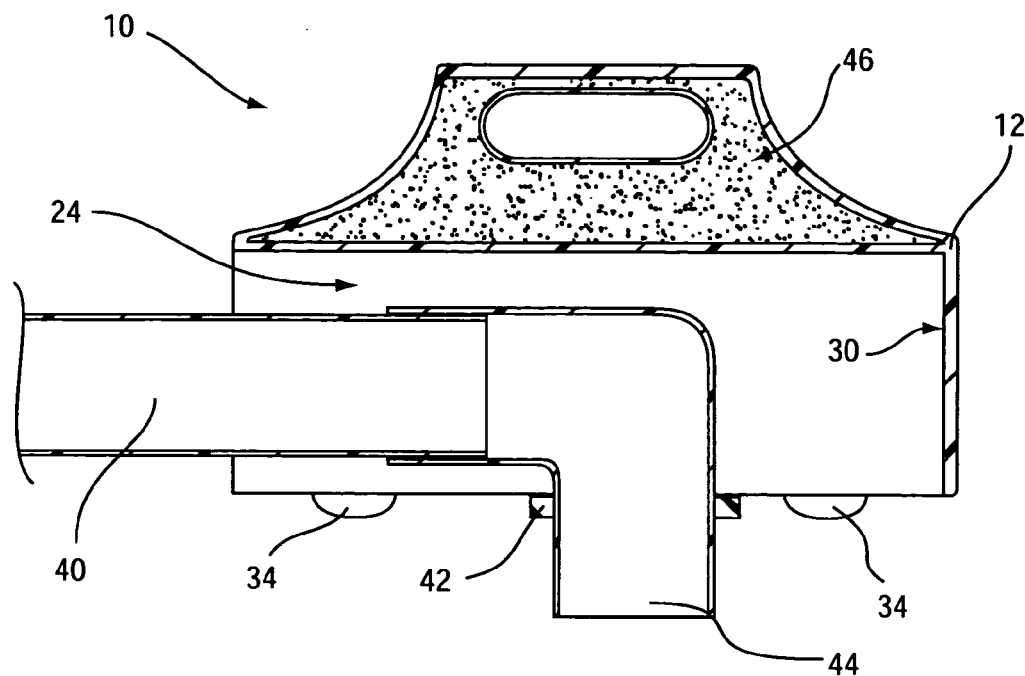
FIG. 5 is a section view of a hold down device holding a discharge hose taken along line 5-5 of FIG. 4.

In describing the use of the present invention further, although the invention may be readily adapted to a variety of embodiments of a hold down device, with reference to FIGS. 3-5 and for the exemplary purposes of this disclosure, hold down device 10 is shown in use with discharge hose 40 which is coupled to sewer fitting 44. As is typical with discharge hoses and sewer fittings, splash ring 42 may be coupled to sewer fitting 44 to inhibit splashing of waste out of a refuse hole of a dump receptacle. Container 12 is filled with filling material 46, which for exemplary purposes is sand but will be understood by those of ordinary skill in the art that filling material 46 may be water, rocks, and other like materials or combination thereof. Additionally, container 12 may be manufactured as a solid material on order to provide the weight necessary to hold down discharge hose 40 and sewer fitting 44, thus eliminating the need for filling material 46.

The end portion of sewer fitting 44 is inserted into a refuse hole of a dump receptacle which is typically located on a ground surface. Hold down device 10 is configured to function properly on all ground surface types such as, for example, dirt, grass, gravel, concrete, asphalt, artificial turf, and other similar surfaces. After insertion of sewer fitting 44 into the refuse hole, hold down device 10 is placed over sewer fitting 44 and a portion of discharge hose 40 which is connected to a holding tank located on a recreational vehicle. Hose recess 24 is of dimensions to easily accommodate various sizes of discharge hoses, and can be manufactured to fit all sizes of discharge hoses available. The placing of hold down device 10 over sewer fitting 44 and hose 40 is easy and consumes little time. Feet 34 serve to give hold down device 10 a balanced base to rest on when splash ring 42 is coupled to sewer fitting 44. The operation of a valve then allows the discharging of waste, which includes black water and grey water.

Additionally, if more weight is needed, hold down device 10 can easily be emptied of filling material 46 and filled with another heavier material. Also, embodiments of the present invention may be stacked upon each other in order to place the weight necessary to overcome the force of the waste draining from the holding tank. Or an additional hold down device 10 can be used as a mid-hose hold down. Therefore, hold down device 10 can be adapted for all types of weight problems and securing problems.

In addition to the weight of hold down device 10 which inhibits dislodging of hold down device 10, hold down device 10 may be made of bright visible colors for alerting others of the presence of the discharge hose. This provides a second form of prevention of dislodging hold down device 10.

Upon completion of draining of the holding tank, hold down device 10 can be removed and easily washed off with soap and water and stored for future use. Hold down device 10 for exemplary purposes of this disclosure has a radially tapered top portion of container 12 on each side of handle 20 which enables discharge hose 44 to be wrapped around hold down device 10 for easy and convenient storage. Hold down devices of the present invention may also be adapted to have a locking mechanism for prevention of theft.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation. Similarly, any steps or sequence of steps of methods indicated herein are given as examples of possible steps or sequence of steps and not as limitation

The invention claimed is:

1. A hold down device for holding down a flexible discharge hose comprising:
   a container comprising a top portion, a bottom portion, a front end and a rear end;
   a handle for carrying the hold down device;
   feet coupled to the bottom portion of the container; and
   a hose recess comprising a right wall, a left wall, an upper wall, a rear wall, and an opening on the front end of the container, the hose recess extending from the front end up to the rear end of the container to form the rear wall and receiving a discharge hose and a sewer fitting between the right wall, left wall, upper wall, rear wall, and a ground surface the bottom portion of the container rests on for holding down of the discharge hose during draining.

2. The hold down device of claim 1, wherein the container is hollow and configured to be filled and emptied with a filling material for varying the weight of the hold down device.

3. The container of claim 2, wherein the container is a solid material of a sufficient weight for holding down the discharge hose during draining.

4. The hold down device of claim 1, wherein the container is configured to vertically stack at least containers for added weight to hold down the discharge hose.

5. The hold down device of claim 1, wherein the handle is integral with the top portion of the container and configured to allow the discharge hose to wrap around the handle for storing the hold down device.

6. The hold down device of claim 1, further comprising a fill hole on the top portion of the container for filling and emptying the container with a filling material and a plug removably coupled to the fill hole for retaining the fill material within the container.

7. The hold down device of claim 1, wherein the feet are each a circular molded relief protruding from the bottom portion of the container and configured to rest over a splash ring coupled to the sewer fitting coupled to an end portion of the discharge hose and rest on the ground surface.

8. A hold down device for holding down a flexible discharge hose comprising:
   a container comprising a top portion, a bottom portion, a front end, and a rear end wherein the container is hollow for filling and emptying the container with a filling material to vary the weight of the hold down device;
   a handle for carrying the hold down device;
   feet coupled to the bottom portion of the container;
   a fill hole on the top portion of the container for filling and emptying the container with a filling material;
   a plug removably coupled to the fill hole for retaining the fill material within the container; and
   a hose recess comprising a right wall, a left wall, an upper wall, a rear wall, and an opening on the front end of the container, the hose recess extending from the front end up to the rear end of the container to form the rear wall and receiving a discharge hose and a sewer fitting between the right wall, left wall, upper wall, rear wall, and a ground surface the bottom portion of the container rests on for holding down of the discharge hose during draining.

9. The container of claim 8, wherein the container is a solid material of a sufficient weight for holding down the discharge hose during draining.

10. The hold down device of claim 8, wherein the container is configured to vertically stack at least two containers for added weight to hold down the discharge hose.

11. The hold down device of claim 8, wherein the handle is integral with the top portion of the container and configured to allow the charge hose to wrap around the handle for storing the hold down device.

12. The hold down device of claim 8, wherein the feet are each a circular molded relief protruding from the bottom portion of the container and configured to rest over a splash ring coupled to the sewer fitting coupled to an end portion of a discharge hose and rest on the ground surface.

13. The hold down device of claim 1, wherein the feet are integral with the hose recess.

14. The hold down device of claim 1, wherein the feet are integral with the hose recess.

* * * * *

UNITED STATES PATENT AND TRADEMARK OFFICE
CERTIFICATE OF CORRECTION

| | | |
|---|---|---|
| PATENT NO. | : 7,731,133 B2 | Page 1 of 1 |
| APPLICATION NO. | : 10/828746 | |
| DATED | : June 8, 2010 | |
| INVENTOR(S) | : Jerome J. Kochanski | |

It is certified that error appears in the above-identified patent and that said Letters Patent is hereby corrected as shown below:

Claim 4 line 2 should read --...vertically stack at least two containers...--

Signed and Sealed this
Third Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,731,133 B2 | |
| APPLICATION NO. | : 10/828746 | |
| DATED | : June 8, 2010 | |
| INVENTOR(S) | : Jerome J. Kochanski | |

It is certified that error appears in the above-identified patent and that said Letters Patent is hereby corrected as shown below:

Column 6, line 2
(Claim 4 line 2) should read --...vertically stack at least two containers...--

This certificate supersedes the Certificate of Correction issued May 3, 2011.

Signed and Sealed this
Thirty-first Day of May, 2011

David J. Kappos
*Director of the United States Patent and Trademark Office*